April 14, 1959     C. THUMIM     2,881,870
TEMPERATURE COMPENSATED TIME DELAY DASHPOT
Filed April 20, 1954     3 Sheets-Sheet 1
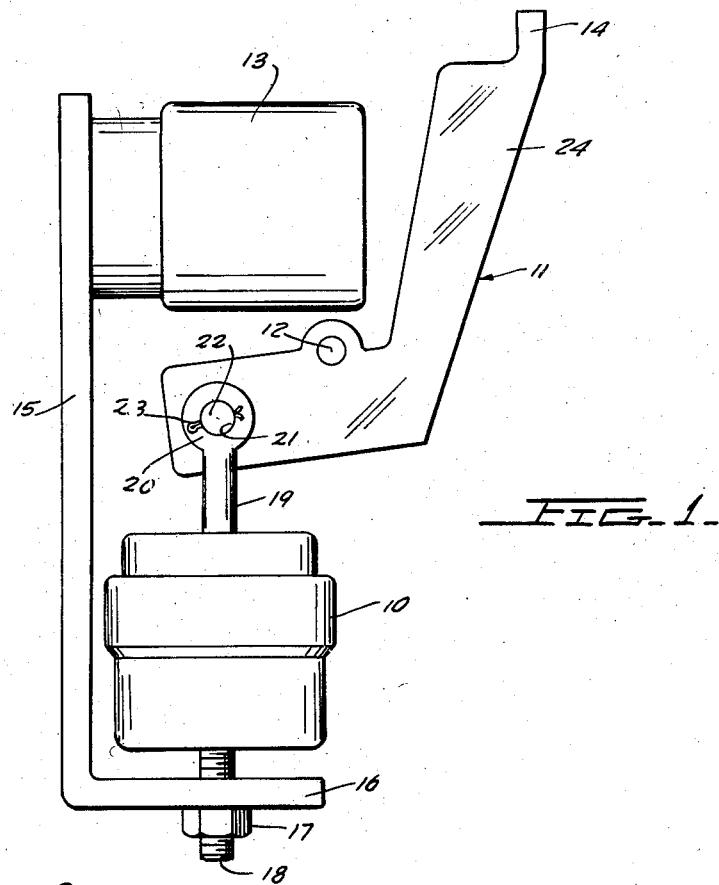
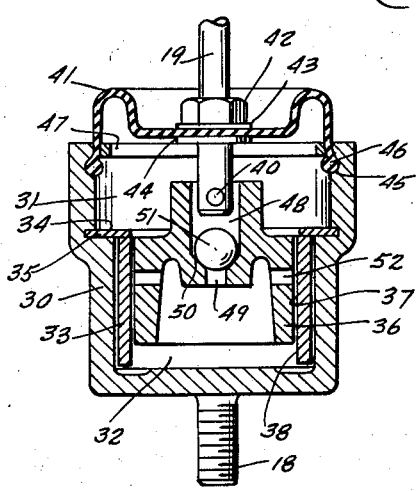
INVENTOR.
CARL THUMIM
BY
Ostrolenk & Faber
ATTORNEYS April 14, 1959    C. THUMIM    2,881,870
TEMPERATURE COMPENSATED TIME DELAY DASHPOT
Filed April 20, 1954    3 Sheets-Sheet 2

INVENTOR.
CARL THUMIM
BY
Ostrolenk & Faber
ATTORNEYS

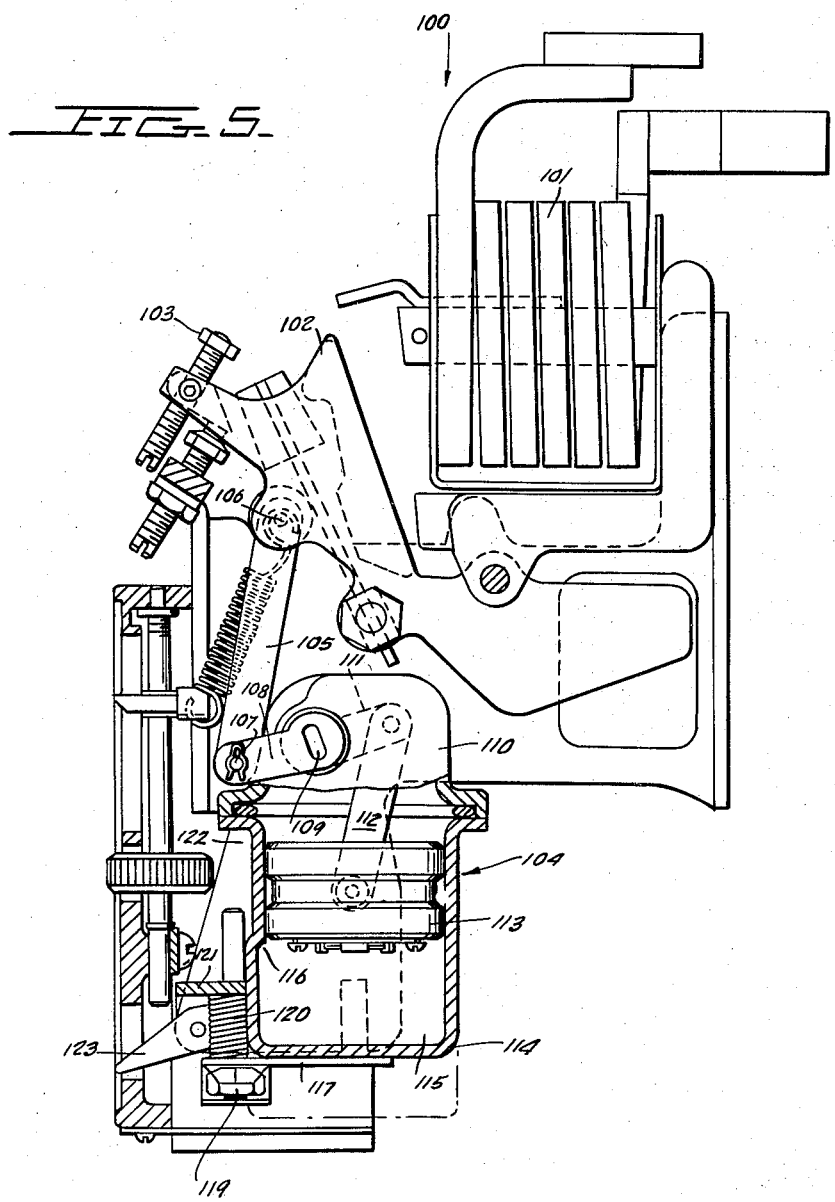

United States Patent Office 2,881,870
Patented Apr. 14, 1959

2,881,870
TEMPERATURE COMPENSATED TIME DELAY DASHPOT

Carl Thumim, Westbury, N.Y., assignor to I-T-E Circuit Breaker Company, Philadelphia, Pa.

Application April 20, 1954, Serial No. 424,369

3 Claims. (Cl. 188—96)

This invention relates to a temperature compensated time delay dashpot.

In the use of an oil type dashpot as a time delay device, one important problem which arises is the variation in operation due to temperature changes. It is apparent that changes in temperature will not only cause the dashpot piston and cylinder to expand and contract, but will also cause the viscosity of the oil to vary.

In situations where the time delay must be accurate and consistent, attempts have been made to reduce the effects of temperature variation by using materials which have low rates of thermal expansion. An example of this, has been the use of silicone oils. However, even here, the oil viscosity still varies slightly with temperature. Moreover, the cost of such an oil is considerably higher than the costs of ordinary oils.

Since the effects of temperature changes upon the components of the dashpot cannot be eliminated completely, it is an object of my invention to coordinate these effects to provide a dashpot whose time delay will always be the same regardless of the condition of the component parts due to temperature.

Accordingly, as an example of my invention, I provide a dashpot cylinder formed of a material having a low coefficient of thermal expansion and a piston formed of a material having a high coefficient of thermal expansion.

In normal operation, as the piston is moved, the oil in the dashpot passes from one side of the piston to the other through a space formed between the piston and cylinder walls. However, when heat is applied to the dashpot the oil becomes thinner and in the conventional dashpot would run more quickly through said space, thus shortening the time delay. But, in my device, the application of heat would cause the piston to expand faster than the cylinder and narrow the space therebetween. By carefully selecting the materials to be used in constructing the dashpot, the space will vary in direct proportion to the viscosity of the oil. Consequently, no matter how thin or thick the oil becomes, the space through which it must pass will be of the correct dimension to keep the passage of oil constant.

The above is, of course, only one example of the application of my invention. But it may be seen that it is an object of my invention to provide a dashpot formed of materials which have dissimilar coefficients of thermal expansion whereby the oil passageway will always be appropriate to keep the flow of oil through the dashpot constant regardless of the temperature conditions.

Another object of my invention is to provide a dashpot wherein the cylinder has a lower coefficient of thermal expansion than the piston so that the oil passageway between the two will vary in size in response to temperature changes.

Yet another object of my invention is to provide a dashpot wherein the cylinder has a lower coefficient of thermal expansion than the piston whereby the oil passageway between the two varies in size as the viscosity of the oil varies due to temperature changes.

It is a further object of my invention to provide a dashpot wherein a sleeve insert may be fitted within the dashpot cylinder and the piston may be slid within the sleeve. The coefficient of thermal expansion of said insert is lower than that of the piston whereby an oil space between the insert and piston may be varied in accordance with viscosity variations of the dashpot oil due to temperature changes.

Although the cylinder could be made of a low expansion material, it may be desirable to use a sleeve insert since the cost of a low expansion material required may be quite high in which case the small sleeve will be economical. Also, the sleeve is free floating and of uniform section which tends to maintain a uniform distribution gap between the piston and cylinder and thus prevents binding due to unequal or localized expansion.

An additional function of my dashpot is also to be noted; that is, when the dashpot is used in certain special applications, such as for the time delay device in an electrical circuit breaker, it is desirable to have the dashpot piston move slowly for a certain period of time delay and then continue movement quickly to permit the connecting circuit breaker assembly to snap open.

Thus, it is an additional object of my invention to provide a separate oil passageway through the dashpot piston to permit a rapid flow of oil therethrough to bypass the space between the piston and the cylinder or insert after the piston has moved a predetermined amount.

Other objects and advantages will be apparent from the following description.

On the accompanying drawings forming a part of the specification and showing preferred forms of this invention:

Figure 1 is a view showing a dashpot connected with a circuit breaker tripping armature.

Figure 2 is a cross-sectional view of a pull type dashpot having an insert sleeve.

Figure 5 is a side sectional view of a dashpot having means to compensate for ambient temperature and illustrates both the control of the dashpot over the armature of the over-current relay and the adjustment means for the dashpot.

Figure 3:
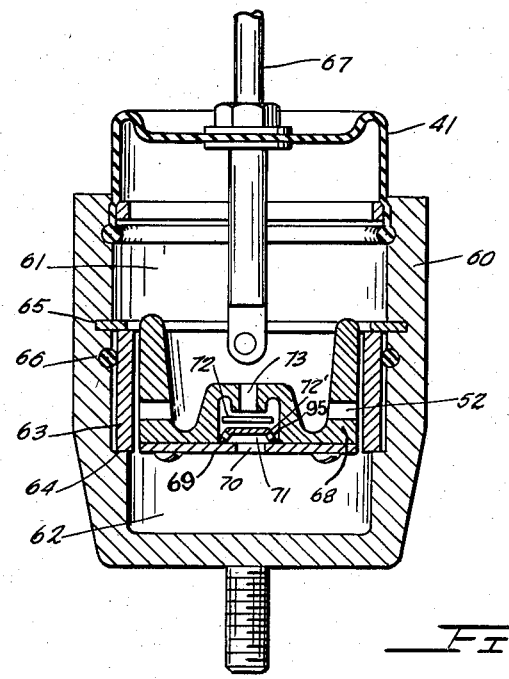
Figure 3 is a cross-sectional view of a push type dashpot having an insert sleeve.

To illustrate one application of my dashpot, I have shown the dashpot 10 in operative connection with a tripping armature 11 of a circuit breaker.

The circuit breaker, and its components, form no part of this invention. Therefore, the description relating to the same will be brief.

The armature 11 is pivoted at 12 and adapted to be drawn towards electromagnet 13 when said magnet is energized by an overload of current passing through the circuit breaker. A finger 14 at the upper end of the armature trips a mechanism, not shown, which opens the circuit breaker interrupters.

The electromagnet is mounted upon a backing plate 15 having a lower flange 16. A hole may be drilled through this flange and a nut 17 welded beneath the hole.

The dashpot has a stud 18 fastened at the lower end thereof which stud threadedly engages nut 17. In this manner the dashpot is supported in operative position and, of course, may be threaded into the nut the necessary amount to cause the desired time delay.

It is apparent that there are many different methods which would serve to support the dashpot. One of these suggested is to rotatably attach the stud to the dashpot and thread the hole in flange 16. In this manner, the dashpot is freely adjustable, up or down, merely by rotating the nut.

At the upper end of the dashpot is a piston rod 19 having a flattened end 20. A hole 21 is formed in said flattened end and through this hole a pin 22 extends. The pin which is rigidly fastened to the armature, has an opening through which a cotter-pin 23 is passed, to hold the pin in position in relationship to the piston rod.

Thus, in operation, the electromagnet 13 is energized by an overload current through the circuit breaker. The armature end 24 is drawn towards the circuit breaker, but the rotation of the armature around the pivot 12 is delayed for a predetermined period by the dashpot. When the armature pivots toward the electromagnet, the finger 14, trips the interrupter opening mechanism.

Referring now to the cross-sectional view shown in Figure 2. A cylinder 30 is illustrated as having an upper bore 31 and a lower bore 32. Loosely fitted in the lower bore is a sleeve insert 33 formed of a material having a relatively low coefficient of thermal expansion. For this purpose, "Invar" has been found to be satisfactory. A snap ring 34, fitted in cylinder groove 35, securely holds the sleeve insert in position in the lower bore.

Slidably fitted within said insert is a piston 36 made of magnesium or some other material having a relatively high coefficient of thermal expansion. It is to be noted that a space 37 is formed between the piston and inner wall 38 of the insert.

A piston rod 19, connected to the piston by a pin 40, extends through an opening in rubber boot 41. The opening in the boot is sealed and the boot fastened to the piston rod by means of nut 42 and washer 43 pressing the rubber against a flange 44 formed integral with said piston rod.

The rubber boot itself is formed with a bead 45 which bead rests in a groove 46 cut in the cylinder upper bore. To retain the boot in position, a snap ring 47 presses the rim of the boot against the wall of the bore.

The piston is provided with a check valve having a passageway 48 connecting with a small opening 49 at a shoulder forming section 50. A ball valve 51 is fitted in the passageway.

In operation, when the piston rod is pulled upwards, the oil contents of the cylinder attempts to run from the upper bore into the lower bore through space 37 formed between the piston and insert. Since the size of the space is carefully predetermined, oil will pass through at a known rate and consequently the movement of the piston is slowed down. Should the viscosity of the oil decrease due to heat, the piston expansion will decrease the space 37 and result in the same desired rate of oil flow as above.

When the piston is moved upwardly, the ball valve is closed, but when the piston is returned to its normal position within the sleeve insert, the ball valve opens and allows the oil to quickly return from the lower cylinder bore to the upper bore.

Additionally, where it is desired to have a short time delay followed by rapid movement of the piston, ports 52 may be drilled through said piston. It is to be noted that when the piston is in its normal position within the insert, the ports 52 open into the space 37. However, when the piston is raised a sufficient amount, the ports clear the insert sleeve and provide a direct oil passage between the cylinder upper bore and lower bore. Thus, when the ports clear the insert, the piston begins rapid movement. These ports may or may not be included in the piston depending on the type of time delay desired.

In Figure 3, there is shown a push type dashpot of substantially the same structure shown above in Figure 2. Here, cylinder 60 is formed with a larger upper bore 61 and a smaller bore 62. The sleeve insert 63 is fitted within the upper bore and rests upon shoulder 64. A snap ring 65 retains the insert in position.

In addition, a rubber sealing strip 66 located in a groove in the upper cylinder seals the gap between the outer diameter of the sleeve insert and the cylinder bore.

The piston rod 67 connects with the piston 68 and extends through rubber boot 41. The rubber boot 41 is the same as that shown in Figure 2 and is fastened in place in the same manner.

The piston 68 has a face plate 69 secured thereto by screws or the like. A hole 70 through the face plate connects with check valve passageway 71 in which a wafer check valve 72 is located. The wafer is adapted to close the opening 73 when the piston is pushed down and open when the piston is pulled up. When piston 68 is being pulled up wafer check valve 72 is retained in piston 68 by platform element 72' having side passages 95 which communicate with face plate opening 70.

In this embodiment too, ports 52 may be provided to shorten the time delay action of the dashpot.

Figure 4:
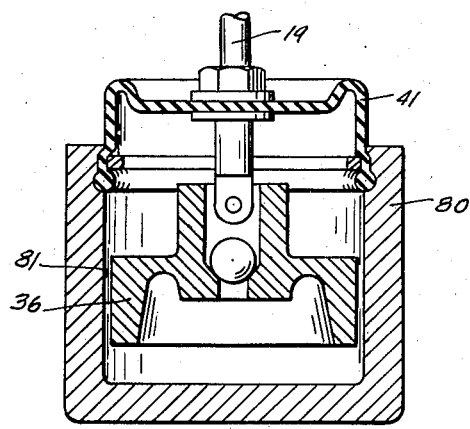
Figure 4 is a cross-sectional view of a modified pull type dashpot.

In Figure 4 there is again shown a pull type dashpot having the same piston and valve structure as shown in Figure 2. However, in this case, the cylinder 80 is formed of a material having a low coefficient of thermal expansion and no inserts are used. Thus, thermal changes cause the space 81, between the piston and cylinder, to vary in accordance with the change in viscosity of the dashpot oil.

In Figure 5, I have shown a time delay dashpot secured to the armature of the over-current relay of a circuit breaker. The over-current relay 100 may be of the type shown in copending application Serial No. 254,349, filed November 1, 1951, and is comprised of the coil 101 and armature 102. When the coil 101 is energized by fault current thereby moving its armature 102 from the neutral position, seen in Figure 5, to an energized position, the screw 103 will engage means to operate the trip latch of the circuit breaker.

The dashpot 104, secured to the armature 102 in a manner hereinafter described, will delay the operation of the armature 102 thereby resulting in time delay trip of the circuit breaker controlled by the mechanism.

A link 105 is pivotally secured at one end 106 to the armature 102 and at the opposite end is pivotally secured at 107 to the crank 108. The crank 108 is secured to the shaft 109, extends through and is supported by the housing 110 of the time delay dashpot 104. Crank 111 is secured to the shaft 109 within the housing 110.

A link means 112 is secured at one end to the crank 111 and at the opposite end to the piston 113. The lower chamber 115 of the cylinder housing 114 is filled with oil. Hence, when the armature 102 is attracted toward its energized position, it will tend to move the piston 113 downwardly through the link mechanism 105, 108, 111, 112. Due to the fact that the oil in the area 115 must be displaced, the armature 102 will be moved to its energized position with time delay.

The cylinder housing 114 is provided with an enlarged cross-sectional area indicated generally as 116. At a predetermined distance, the piston 113 will encounter the enlarged cross-sectional area 116 and, hence, the armature 102 will complete the last portion of its movement toward energized position without time delay.

The entire housing 114 is mounted on bracket 117 which, in turn, holds and maintains the adjustment screw 119. Spring means 120, positioned concentric with respect to the center of the adjustment screw 119, is lodged between the supporting bracket 117 and a stationary bracket 121.

In the position shown in Figure 5, the cylinder of the dashpot 104 is mounted in its uppermost position thereby introducing a maximum time delay for the operation of the armature 102. However, when the adjustment screw 119 is rotated so that it is moved downwardly, the entire cylinder housing 110, 114 will also be moved downwardly therewith.

Since the shaft 109 will also be moved downwardly, the cranks 108 and 111 will be rotated in a clockwise direction thereby lowering the piston 113 with respect to the cylinder housing 114. Hence, the piston 113 will not have to be moved down as great a distance before it reaches the enlarged cross-sectional area 116 of the cylinder when the armature 112 is being moved from neutral to energized position. Thus, when the adjustment screw 119 lowers the dashpot to its lowermost position (shown by the dotted line in Figure 5), a minimum time delay will be introduced for the armature 102.

An extension means 122 is secured to the external portion of the housing 114 and has a pivotally mounted indicator 123 secured to one end thereof. Hence, as the dashpot 104 is moved from its extreme upward position, seen in Figure 5, to its extreme lower position, seen by the dotted line in Figure 5, the indicator 123 will be rotated in a clockwise direction thereby giving an external indication of the degree of magnitude of the time delay.

As heretofore fully explained, the dashpot is usually calibrated for a predetermined ambient temperature. Since the viscosity of the oil will change with a change in ambient temperature, the calibrated time delay will change with variations in the ambient temperature.

In order to compensate for the variations in ambient temperature, that is, to compensate for the variations in the viscosity of the oil, the piston 113 is made of a high expansive metal alloy such as aluminum and the cylinder 114 is made of a low expansion alloy such as bronze. That is, by having the internal member made of a metal having a high thermal coefficiency of expansion and having the external member made of material having a low thermal coefficient of expansion, the space between these two units will decrease when the ambient temperature is increased to compensate for the decrease in the oil viscosity.

In like manner, when the ambient temperature decreases, the annular orifice between piston 113 and the cylinder 114 will increase to thereby compensate for the increase in oil viscosity.

This invention may be developed within the scope of the following claims without departing from the essential features of said invention. Accordingly, it is desired that the specification and drawings be read as being merely illustrative of a practical embodiment of the same and not in a strictly limiting sense.

I claim:

1. A dashpot comprising a cylinder having a bore, an insert axially secured within said bore, a piston slidably fitted within said insert with a space formed between said piston and said insert, said piston being comprised of a first material and said insert being comprised of a second material having a lower coefficient of expansion than said first material whereby the thickness of said space varies in response to the temperature of a liquid contained in said cylinder, said insert being loosely fitted with respect to said bore to permit transverse movement with respect to the axis of said cylinder and thereby prevent binding between said piston and said insert; said piston having a passageway extending therethrough and connecting the space between said insert and piston to one face of said piston, said piston formed with an opening connecting said one face to the opposite face of said piston and a valve located in said opening, said valve being adapted to open when said piston slides in one direction and to close when the piston slides in the opposite direction.

2. A dashpot comprising a cylinder having a first bore extending part way therethrough and a second bore communicating therewith, an insert axially secured within said second bore, a piston slidably fitted within said insert with a space formed between said piston and said insert, said piston being comprised of a first material and said insert being comprised of a second material having a lower coefficient of expansion than said first material whereby the thickness of said space varies in response to the temperature of a liquid contained in said cylinder, said insert being loosely fitted with respect to said bore to permit transverse movement with respect to the axis of said cylinder and thereby prevent binding between said piston and said insert, said insert inner diameter being smaller than the diameter of said first bore.

3. A dashpot comprising a cylinder having a first bore extending part way therethrough and a second bore communicating therewith, an insert axially secured within said second bore, a piston slidably fitted within said insert with a space formed between said piston and said insert, said piston being comprised of a first material and said insert being comprised of a second material having a lower coefficient of expansion than said first material whereby the thickness of said space varies in response to the temperature of a liquid contained in said cylinder, said insert being loosely fitted with respect to said bore to permit transverse movement with respect to the axis of said cylinder and thereby prevent binding between said piston and said insert, said insert inner diameter being smaller than the diameter of said first bore, said piston being formed with an opening therethrough, a valve located in said opening, said valve being adapted to open when said piston slides in one direction and to close when the piston slides in the opposite direction.

References Cited in the file of this patent

UNITED STATES PATENTS

| | | |
|---|---|---|
| 831,615 | Lammert | Sept. 25, 1906 |
| 1,074,961 | Leonard | Oct. 7, 1913 |
| 1,407,320 | Bouche | Feb. 21, 1922 |
| 1,529,235 | Bechereau | Mar. 10, 1925 |
| 1,706,188 | Sengebusch | Mar. 19, 1929 |
| 2,629,462 | Peek | Feb. 24, 1953 |
| 2,695,777 | Garrison et al. | Nov. 30, 1954 |

FOREIGN PATENTS

| | | |
|---|---|---|
| 1,053,740 | France | Sept. 30, 1953 |
| 653,869 | Great Britain | May 30, 1951 |
| 460,421 | Italy | Nov. 30, 1950 |